US005523566A

United States Patent [19]

Fuerstenau et al.

[11] Patent Number: 5,523,566

[45] Date of Patent: Jun. 4, 1996

[54] METHOD FOR DETECTION AND ANALYSIS OF INORGANIC IONS IN AQUEOUS SOLUTIONS BY ELECTROSPRAY MASS SPECTROMETRY

[76] Inventors: Stephen D. Fuerstenau, 1440 Leroy Ave., Berkeley, Calif. 94708; John B. Fenn, 4909 Cary Street Rd., Richmond, Va. 23226

[21] Appl. No.: 278,032

[22] Filed: Jul. 20, 1994

[51] Int. Cl.[6] .................... B01D 59/44; H01J 49/00

[52] U.S. Cl. .................... 250/282; 250/288

[58] Field of Search .................... 250/281, 282, 250/288

[56] References Cited

U.S. PATENT DOCUMENTS

| | | | |
|---|---|---|---|
| Re. 34,757 | 10/1994 | Smith et al. | 250/288 |
| 4,209,696 | 6/1980 | Fite | 250/281 |
| 4,300,044 | 11/1981 | Iribarne et al. | 250/282 |
| 4,667,100 | 5/1987 | Lagna | 250/282 |
| 5,170,053 | 12/1992 | Hail et al. | 250/288 |
| 5,171,989 | 12/1992 | Williams et al. | 250/288 |

*Primary Examiner*—Bruce C. Anderson
*Attorney, Agent, or Firm*—Ohlandt, Greeley, Ruggiero & Perle

[57] ABSTRACT

An electrospray mass spectrometric method for analyzing an aqueous solution containing inorganic ion species first enhances the signals for small inorganic ions in electrospray mass spectrometric analysis of aqueous solutions by substantially diluting a sample of the aqueous solution with an organic solvent. The method also removes solvent molecules and other ligands from the small inorganic ions formed in electrospray ionization before mass analysis is complete, by appropriate application of electric fields to accelerate the ions so they will have energetic collisions with neutral gas molecules.

18 Claims, 6 Drawing Sheets

METHOD FOR DETECTION AND ANALYSIS OF INORGANIC IONS IN AQUEOUS SOLUTIONS BY ELECTROSPRAY MASS SPECTROMETRY

This invention was made with government support under grant number GM 31660 awarded by the Department of Health and Human Services. The government has certain rights in this invention.

FIELD OF THE INVENTION

This invention relates to improvements in a method for mass spectrometric analysis of small inorganic ions in aqueous solutions. In particular, it is concerned with detecting and identifying such ions at very low concentration levels such as those encountered, for example, in environmental waters.

BACKGROUND OF THE INVENTION

There are many techniques used in the analysis of water for contaminants. They include a variety of traditional but tedious "wet chemistry" procedures that can, in principle and with varying degrees of success, determine the kind and concentration of many kinds of solute species, both organic and inorganic. In addition there are a number of bulk property measurements that can indicate the presence of particular kinds of contaminants, but give only approximate information about their nature and amount. Such "symptomatic" tests include measurements of electrical conductivity, pH, refractive index, turbidity, specific gravity, "hardness" and the like.

Many of the above-noted techniques are widely used and give useful indices of water quality, but do not provide the kind of detailed information that society is increasingly demanding as it has learned about the physiological effects of specific species, such as lead and mercury. Even at trace levels, such species have a powerful impact on the quality of life and health. A comprehensive technique for determination of such species should provide, quickly and cheaply, information on the identity and concentration of all elements, and if possible their compounds, that are present, even at trace levels, in a water sample.

The most widely used method that comes anywhere near to approaching an ideal test is Atomic Absorption Analysis (AAA). It is carried out by injecting a water sample into a flame, electrical discharge or other heat source that is hot enough to vaporize all solute species and to decompose them into their component atoms. Radiation from a discharge lamp of a particular elemental species is then passed through the hot vapor. The attenuation of that radiation is a measure of the concentration of the lamp species in that vapor. A different lamp must be provided for each species that is to be determined. Even so, the method is relatively simple and inexpensive and can readily determine elemental concentrations in the water sample with sensitivities in the parts/million range.

A more sensitive method that is useful with a wider range of species is Inductively Coupled Plasma Mass Spectrometry or ICPMS. It also involves injecting a water sample into a high temperature plasma produced by an electrode-less discharge that decomposes essentially all solute species to their constituent atoms or very simple and stable compounds thereof. The discharge transforms some of each of these simple species into ions that are passed into a mass analyzer to produces a mass spectra. Such a spectra generally shows at least one peak for each element or stable compound present in the discharge. ICPMS is very general and much faster than AAA in that it can analyze for all elements, almost simultaneously, without the need of a separate source of radiation, i.e. a lamp, for each species, as is required by AAA. Moreover, it is much faster and more sensitive than AAA, being capable of measuring concentrations at the parts per billion level in the original water sample. It is also more costly because of its need for a mass spectrometer which is a relatively complex and expensive piece of equipment.

Mass spectrometry consists in "weighing" individual molecules by transforming them into ions in vacuo and measuring the response of their trajectories to various combinations of electric and/or magnetic fields. It follows that production of ions from a species of interest, for example by a discharge in ICPMS, is an essential step in performing mass spectrometric analysis. The present invention relates to this essential step, in particular to the relatively new method of producing ions known as "Electrospray Ionization" (ESI), first proposed by Malcolm Dole and co-workers in 1968 (J. Chem. Phys. 49, 2240). This unique approach to ionization, quite different in nature from the method used in ICPMS, did not receive much attention until 1984 when the first results of Yamashita and Fenn were published in America (J. Phys. Chem. 88, 4451 (1984). Similar results were published almost simultaneously in Russia by Gall' et al (Sov. Phys. Tech. Phys. 29, 911 (1984)). Since then the efforts of many investigators have developed ESI into a widely practiced technology that has been described at length in a number of U.S. patents (Labowsky et al, U.S. Pat. No. 4,531,056; Yamashita et al, U.S. Pat. No. 4,542,293; Henion et al, U.S. Pat. No. 4,861,988; and Smith et al, U.S. Pat. Nos. 4,842,701 and 4,885,706;Fenn et al U.S. Pat. No. 5,130,538) as well as in a number of review articles (Fenn et al, Science 246, 64 (1989); Fenn et al, Mass Spectrometry Reviews, 6, 37 (1990); Smith et al, Anal. Chem. 62, 882 (1990); Kebarle and Tang, ibid. 65, 972A (1993)).

ESI has greatly expanded the application of mass spectrometry to the analysis of species comprising solutes in liquid solutions. As an extremely effective species-identifying detector for liquid chromatography, Electrospray Mass Spectrometry (ESMS) is now in daily use by investigators throughout the world. Even when the analyte solute species comprise large, complex and fragile molecules, ESI can transform them, intact, into ions in vacuum ready for mass analysis. Moreover, the ions of large molecules are characterized by such extensive multiple charging that their mass/charge (m/z) ratios are rarely above about 2500, even when the molecular weight (Mr) of the parent molecule is as high as five million! (Nohmi and Fenn, J. Am. Chem. Soc. 114, 3241 (1992)). Consequently, they can be "weighed" with almost any available mass-analyzer. Even relatively inexpensive instruments such as quadrupole mass filters, ion traps, and time-of-flight machines generally have enough resolving power and mass range to obtain reliable values of Mr up to 100,000 or so with an accuracy of 0.01%. Equivalent or better accuracy can be achieved for much larger species by magnetic sector instruments and Fourier-Transform Ion Cyclotron Resonance (FTICR) machines.

Because of its unique ability to produce ions from very large molecules, most studies and applications of ESMS have thus far related to the relatively complex and fragile species involved in biological organisms and their metabolic processes. However, recent results indicate that ESMS might also be very effective in detecting and identifying other kinds of species. The subject invention relates to improvements in the ability of ESMS to detect, and to determine the identity and concentration of, small inorganic ions in water, even at the trace levels that are encountered in various kinds of environmental waters. Availability of a sensitive method of analyzing water for these small inorganic ions is important because even at very low levels, they can have a very large impact on many forms of life. This invention opens the way to substantial improvements in the effectiveness with which ESMS can detect and identify small but significant species. Practice of the invention makes ESMS able to analyze water for small inorganic ions at concentration levels as low as parts per trillion.

SUMMARY OF THE INVENTION

We have learned that when ESMS is carried out on solutions of inorganic salts in certain solvents that contain little or no water, the ms signals for their cations and anions can be orders of magnitude higher than when the same salts are dissolved in solvents containing substantial amounts of water. We have further found that even small amounts of water in these same solvents can greatly diminish the ion signals from the solute species. Indeed, when a very dilute aqueous solution of inorganic salts is mixed with 100 times its volume of non-aqueous solvent, the magnitude of the mass spectrometric peak for the cation is hundreds of times higher than the signal for the same ion obtained with the original solution, even though its concentration in the mixed solvent (comprising mostly the non-aqueous component) is 100 times lower! Thus, the invention brings about a great increase the analytical sensitivity of ESMS for small inorganic ions in aqueous solution by the step of greatly diluting the original aqueous solution with a large proportion a suitable nonaqueous solvent.

It has further been found that all solvation of the inorganic ions can be eliminated by maintaining a substantial voltage difference between the source orifice of a free jet that transports the ES ions from atmospheric pressure into vacuum, and a skimmer that passes a core portion of that jet into a chamber containing a mass analyzer. The nozzle-skimmer voltage difference simplifies interpretation of the mass spectrum by: (1) removing all peaks corresponding to solvated ions and (2) increasing analytical sensitivity by incorporating all ions of a particular element or compound into a single peak of unsolvated ions rather than distributing them among an array of peaks corresponding to ions with varying degrees of solvation. High values of the nozzle-skimmer voltage also appear to enhance sensitivity by increasing the fraction of ions in the jet that pass through the skimmer and reach the analyzer.

As a result of these two operational factors, i.e. (1) diluting the original sample with non-aqueous solvent and (2) maintaining a substantial voltage difference between the skimmer and the source orifice of the free jet, ESMS can achieve analytical sensitivities for small inorganic ions in the parts per trillion range.

ESMS has the advantage that because it is very "soft" (in the absence of the orifice-skimmer voltage difference), it can also provide information on the structure and composition of the more complex and fragile metal-containing species that are the actual inhabitants of many water samples, albeit at the expense of decreased sensitivity. Such "speciation" information is valuable in elucidating the environmental effects of metal ions in natural and waste waters. ICPMS on the other hand involves a very energetic and destructive method of producing ions from metal-containing species, i.e. an electric discharge which removes and destroys all organic ligands from the original parent ion. Thus, an advantage of this invention is that, with no increase in cost or complexity, it provides an ESMS apparatus with the sensitivity of ICPS for elemental analysis of inorganic solutes while retaining the ability to provide speciation information about those solutes. Other advantages of the invention will emerge in the subsequent, more detailed discussion.

DETAILED DESCRIPTION OF THE INVENTION

Figure 1:
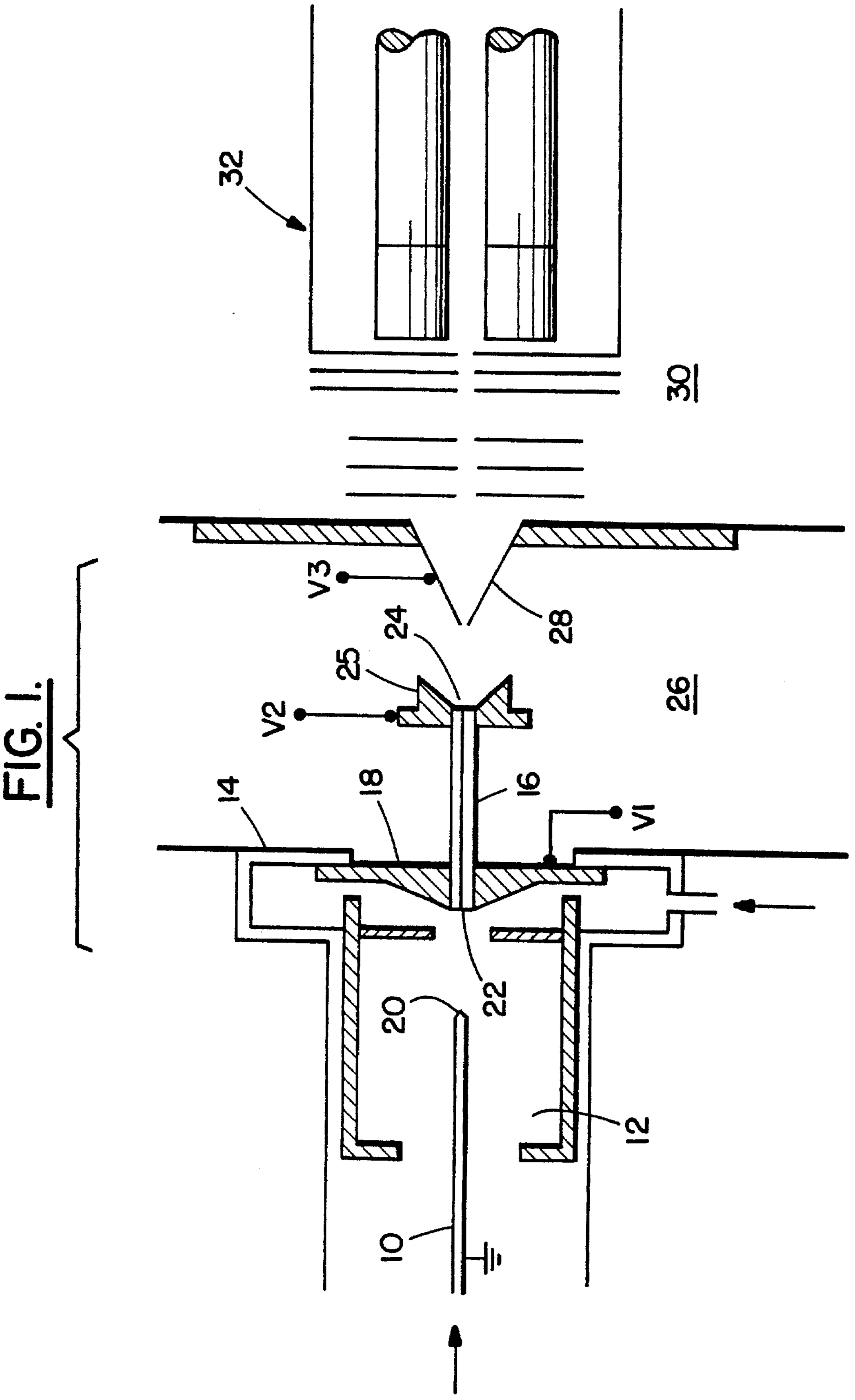
FIG. 1 is a schematic representation of essential features of an Electrospray Mass Spectrometer.

To provide background, a brief description follows of how ESMS works. FIG. 1 is a schematic diagram showing the essential features of an ESMS apparatus that has been previously described in some detail (Whitehouse et al, Analytical Chemistry 57, 675(1985)). Solution containing the analyte species of interest is injected, ordinarily at a rate of a few uL/min, through a sharp-tipped hypodermic needle 10 into a counter-current flow of drying gas-within a chamber 12, typically a few L/min of warm dry nitrogen. Endwall 14 of the chamber 12 contains a glass capillary tube 16 with a length of several cm and a bore of a few tenths of a mm. A metalized front face 18 of tube 16 is maintained at a potential V1 that is several kV "below" grounded needle 10 in order to provide an electrostatic field at the needle tip 20 sufficiently strong to disperse the emerging sample solution into a fine spray of highly charged droplets.

Driven by the associated potential gradient, the droplets drift toward capillary inlet 22 against the counter-current flow of bath gas, shrinking as they proceed due to evaporation of solvent into the bath gas. This shrinking increases a droplet's surface charge density until the Rayleigh limit is reached, at which point, electrostatic repulsion overcomes surface tension and a "Coulomb explosion" breaks up the droplet into a multiplicity of smaller droplets. Continued evaporation and consequent droplet shrinking bring about a sequence of one or more of these explosions to produce droplets with ever increasing surface charge density. Finally the combination of charge density and radius of curvature at the droplet surface produces an electric field intense enough to desorb solute ions from the droplets into the ambient gas. This ion evaporation mechanism, first proposed by Iribarne and Thomson (J. Chem. Phys. 64, 2287 (1976) and ibid. 71, 4451 (1979)) is now accepted by many if not most investigators.

The ions drift down the potential gradient toward capillary entrance 22 where some of them are entrained in the stream of dry bath gas that enters the capillary to emerge at the exit end 24 as a supersonic free jet into first stage 26 of the vacuum system. A core portion of the jet passes through skimmer 28 into second stage 30 of the vacuum system that contains a mass analyzer 32.

The ions entering capillary 16 are in a potential well whose depth equals the potential difference between grounded needle 10 and −V1 at metalized front face 18 of capillary 16.

It has been found that the drift velocity of the ions due to the potential gradient in capillary 16 is much less than the flow velocity of the gas relative to the capillary walls. Consequently, the ions are lifted by the gas flow out of the potential well at capillary inlet 22 back up to $V_2$, the potential of metal collar 25 at capillary exit 24. Indeed, the ions can be raised to ten or more kV above ground potential (depending on the value of V2) as may be required for injection into a magnetic sector analyzer. Providing the required field at the needle tip by this disposition of potentials keeps all external parts of the apparatus at ground potential. Thus an operator is not exposed to a shock hazard.

To be remembered is that the ions of "traditional" mass spectrometry almost always comprise molecules that have lost (or occasionally gained) an electron during a gas phase encounter with an electron, photon or other ion. In ESI the ions comprise-anions or cations in the sample solution, alone or bound to a normally neutral solute molecule containing one or more polar groups to which the anion or cation is bound by some combination of forces due to induced dipoles, hydrogen bonds, or dispersion. These ion-neutral aggregates evaporate or desorb from an evaporating charged droplet into the ambient gas when the field on the droplet becomes sufficiently intense.

Figure 2:
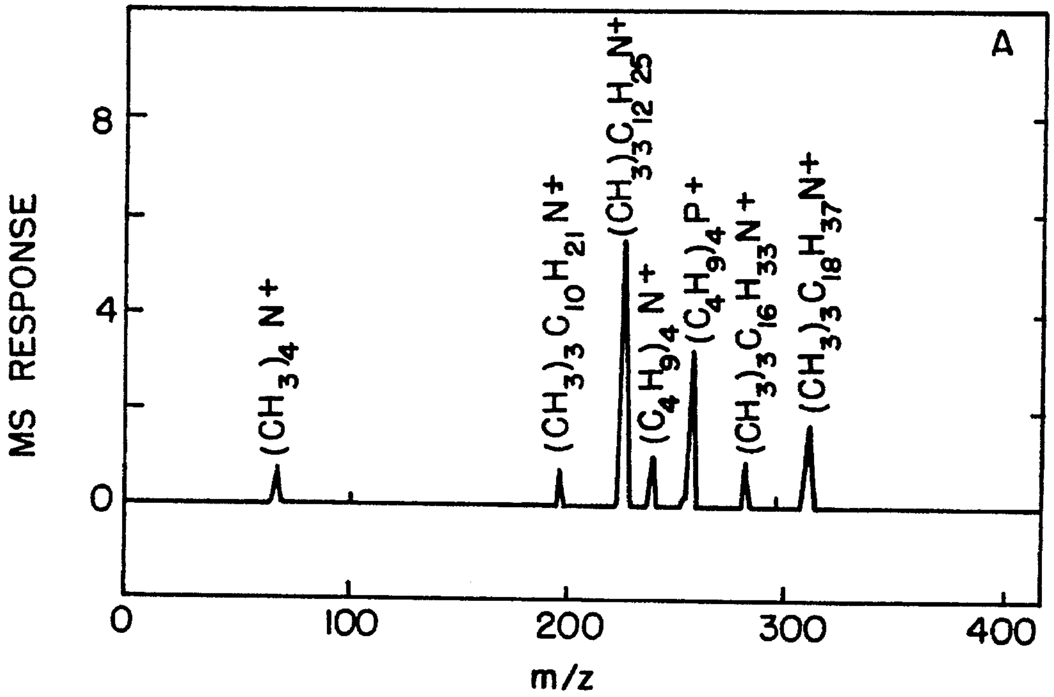
FIG. 2 shows an electrospray mass spectrum of a solution of quaternary alkyl ammonium and phosphonium halides at concentrations of a few parts per million in 50—50 methanol water. Ordinate values of the peaks show relative concentrations of the solutes, identifiable by abscissa values of mass/charge (m/z), equal for these singly charged ions to the molecular weight of the cation.

FIG. 2 shows an early ESMS spectrum (obtained with a predecessor to the apparatus in FIG. 1) by electrospraying a solution containing a mixture of tetra alkylquaternary ammonium or phosphonium halides having concentrations in the range from 2 to 10 ppm. This example is of interest because it is the first ESMS spectrum ever obtained with species that cannot be vaporized without catastrophic decomposition. It shows none of the peaks that would be expected to result from any such decomposition.

Figure 3:
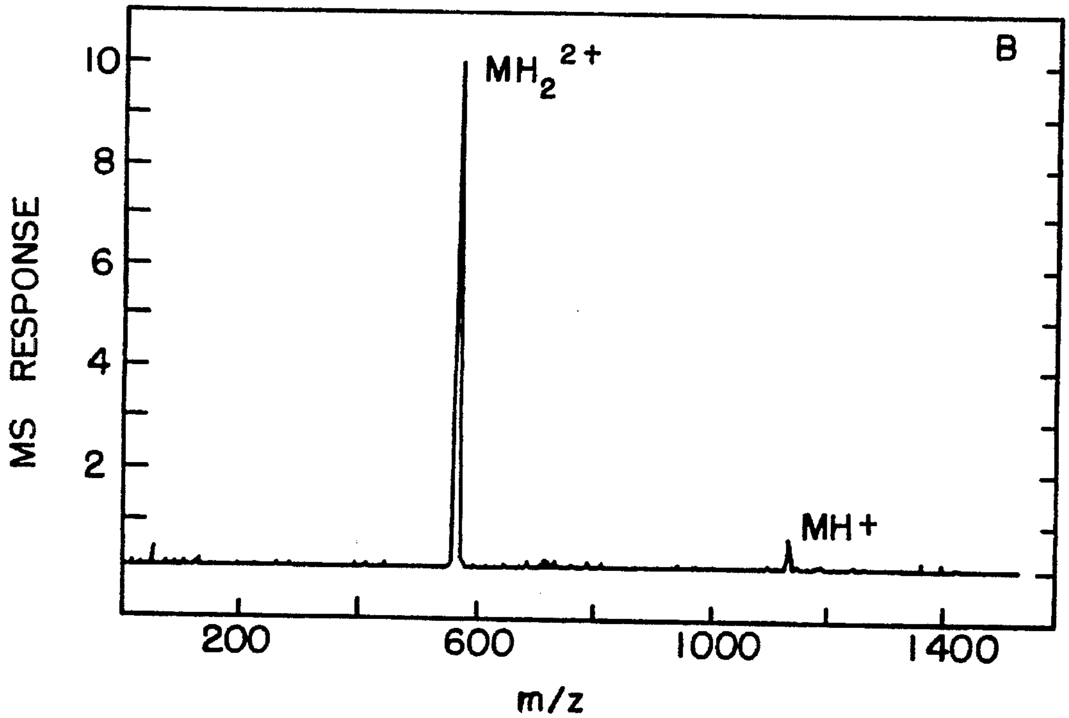
FIG. 3 shows an electrospray mass spectrum of the decapeptide Gramicidin S at a concentration of 0.01 grams/liter in 50—50 methanol-water.

FIG. 3 shows the spectrum for another non-volatile species, the decapeptide gramicidin S. The ion charges in this case are solute protons (H+) bound to the peptide, probably by the more basic of its constituent amino acid residues. It is noteworthy that the doubly charged ion is much more abundant than its singly charged counterpart. Analogous spectra for negative ions (anion-neutral aggregates) of many species can be obtained simply by reversing the polarity of the injection needle voltage.

Figure 4:
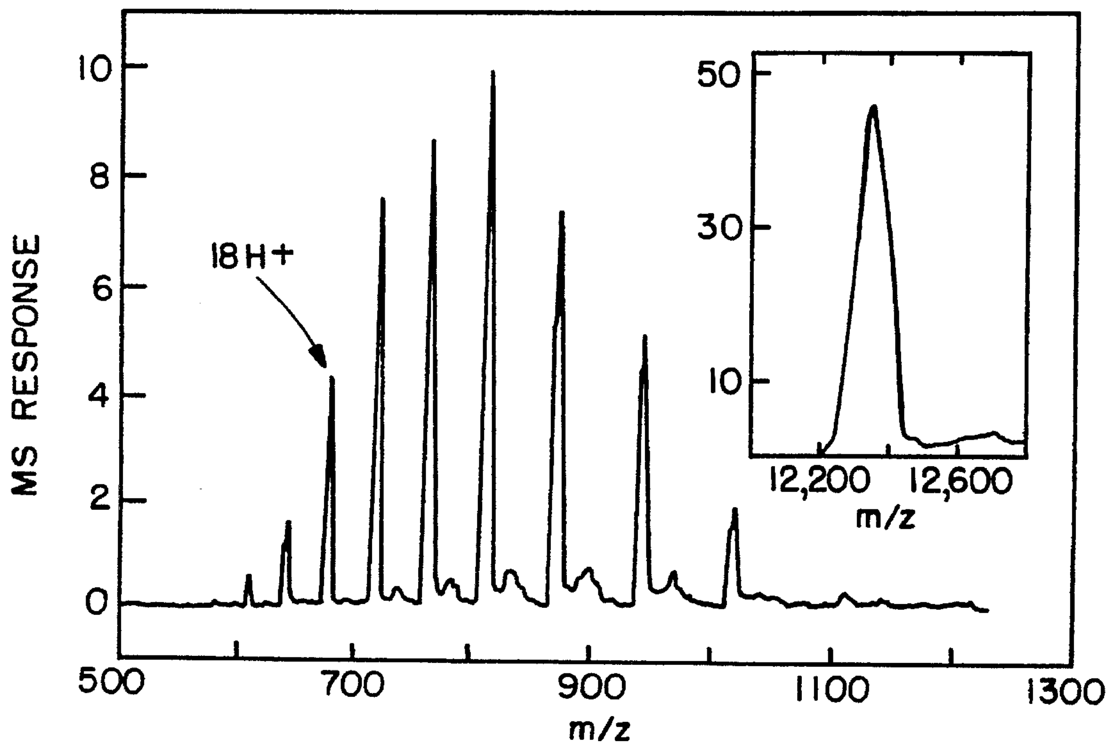
FIG. 4 shows an electrospray mass spectrum of the protein cytochrome c (horse heart) in 50—50 methanol water.

FIG. 4 shows an ESMS spectrum that is typical of molecules large enough to require multiple charges for "lift off" in the droplet surface field. The analyte species is the protein cytochrome-C (horse heart) and the charges on each ion comprise solute protons from the sample solution. The spectrum comprises a sequence of peaks, the ions of each peak differing from those of adjacent peaks by a single charge (H+). Clearly, there are three unknowns associated with the ions of each peak: the mass Mr of the parent molecule, the number z of adduct charges, and the mass m of each adduct charge (a proton in this case). Because of the coherence of the sequence and the multiplicity of the peaks, it is usually straightforward to calculate the values of the three unknowns. Thus each peak becomes an independent measure of Mr so that one can average over these independent values to arrive at a most probable value that is more accurate and reliable than would be the case for other ionization methods which usually give rise to spectra with only one or two peaks for each species.

Computer programs are available that automatically carry out this "deconvolution" process to produce the simple spectrum that would be expected if all the ions of each species comprised the parent molecule with a single adduct charge of zero mass. The inset in FIG. 4 shows the result of such a deconvolution for the illustrated spectrum of cytochrome c. It is to be noted that the scale of ordinate values measuring the peak height (i.e. the relative abundance of contributing ions) is the same for the inset as for the spectrum proper. Clearly, the effective signal/noise ratio is much higher in the deconvoluted spectrum. The deconvolution procedure is described fully in U.S. Pat. No. 5,130, 538 mentioned earlier.

In early experiments with ESMS, peaks were noticed for simple alkali metal ions such as Li+, Na+, and K+. More often than not those ions were solvated with one or more molecules of methanol and/or water because the solvent was a 50—50 mixture of the two. Moreover, if large polar molecules were present in the solution, any small ions present were usually strongly bound to them. Because the primary aim was to produce intact ions of large and complex molecules, we made only a few attempts, with little or no success, to obtain free or solvated ES ions of other metals. Meanwhile, the Alexandrov group had more vigorously pursued the production of metal ions by ES and achieved some success with a number of species, (Alexandrov et al, Proc. 14th Int. Symp. Rarefied Gas Dynamics, Aachen, Germany (1990); Advances in Mass Spectrometery 11, 1706, Heyden, London (1989)).

More recently Kebarle and his colleagues have made some extensive studies of metal ions produced by ESI (J. Chemical Physics 92, 5900 (1990),Int. J. Mass Spectrometry and Ion Processes 101, 325 (1990)), as have Siu and co-workers (J. Am. Soc. Mass Spectrum. 3, 281 (1992)). Agnes and Horlick have also reported results with ESI for quantitative analysis of solutions containing solutes comprising elementary metal cations as well as metal-containing anions (Applied Spectros. 46,401 (1992); Proc. 41st ASMS Conf. on Mass Spectrum. & Allied Topics, San Francisco, Calif. 1993, p. 772).

In all of the above-noted studies, the currents of mass-selected analyte ions were quite weak, often requiring counting techniques for measurement. Moreover, the ions were usually solvated so that the spectra comprised a multiplicity of peaks for each parent metal species, ions of the several peaks differing in the number of molecules of solvation. All of the mentioned previous investigators found that the extent of ion solvation could be substantially reduced by application of a potential difference between the free jet orifice (glass capillary exit 24 in FIG. 1) and skimmer 28.

The solvation difficulties are due in part to a problem that is germane to this invention: water is a particularly refractory solvent for both electrostatic dispersion into charged droplets, and the formation of free solute ions from those droplets. Neither of these processes is well-understood but most investigators seem to believe that the problems with water stem from its unusually high values of surface tension, heat of vaporization and dielectric constant, as well as its very high affinity for most small inorganic ions. Consequently, many of the above-mentioned studies were carried out with solvents having at least some non-aqueous components such as acetone or an alcohol.

A recent review of previous work, made by one of us, attempted to identify and elucidate the factors that govern the rate of desorption of ions from charged droplets and determine their charge state. A progress report on that effort was embodied in J. Am. Soc. Mass Spectrom. 4, 524 (1993). That review strongly reenforced what has been recognized by other investigators, namely, the exponential dependence of ion desorption rate on solute-solvent interaction. Indeed, Roellgen and co-workers (J. Phys. 48, C6-253 (1987); Int. J. Mass Spectrum. Ion Processes 90, 139 (1989)) concluded on the basis of their calculations that the solvent affinity for solute ions is so strong that the Iribarne-Thomson mechanism of surface-field-assisted ion evaporation cannot possibly account for the ion abundance that is found in most ESMS experiments. Roellgen's calculations were for small inorganic ions and thus were somewhat consistent with the very small yields of such ions that investigators had observed, as we noted above.

In spite of Roellgen's conclusions, found persuasive by Kebarle and Tang in the review mentioned earlier, we felt that the field desorption model applies in most situations. Consequently experiments were undertaken that might rebut Roellgen's conclusions by producing larger fluxes of small metal ions from electrospray droplets. Having become increasingly persuaded that solvent-solute interactions play a key role, we carried out experiments with acetonitrile (ACN) as the solvent. It was known that many metal salts are reasonably soluble in this relatively non-polar liquid but little is known about their state in solution.

In a first attempt to try this idea, crystals of the analyte salt were washed, for a few seconds, in HPLC grade ACN having less than 1 ppm dissolved solids and 0.01% water. No attempt was made to measure the amount of salt dissolved, but the crystals were not visibly leached so the concentration of salt in the wash liquid must have been small. A nozzle-skimmer potential difference of 125 volts achieved complete desolvation of the ions except for the case of Ag+ in whose spectrum are two very small peaks corresponding, respectively, to cations with one and two molecules of solvation.

Figure 5A:
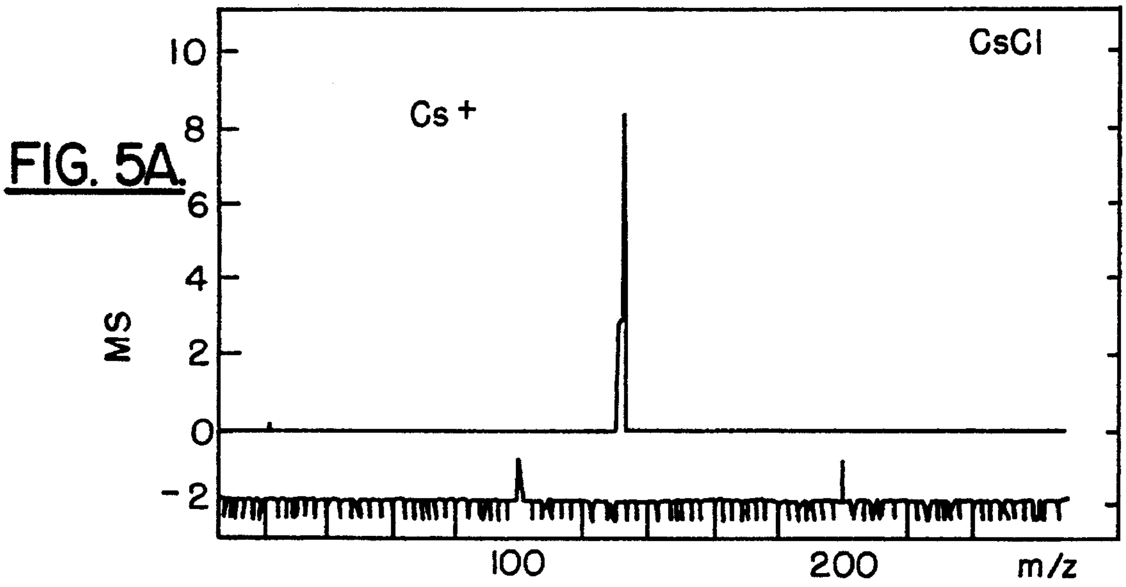
FIGS. 5A–5C presents mass spectra showing peaks for metal cations obtained by electrospraying solutions in acetonitrile of CsCl, CuSO4, and AgNO3, respectively.
Figure 5B:
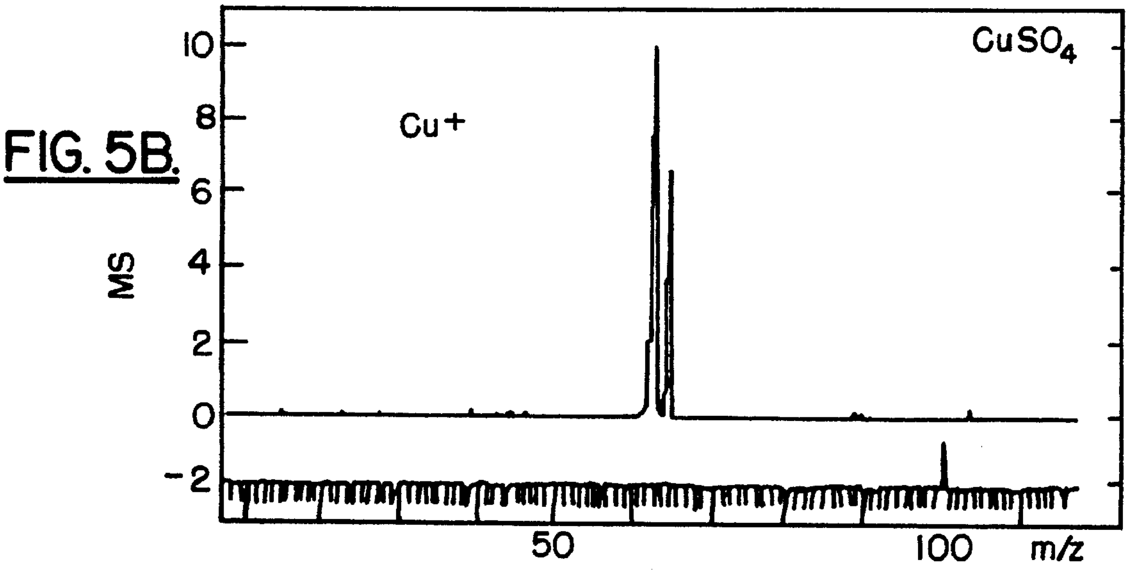
Figure 5C:
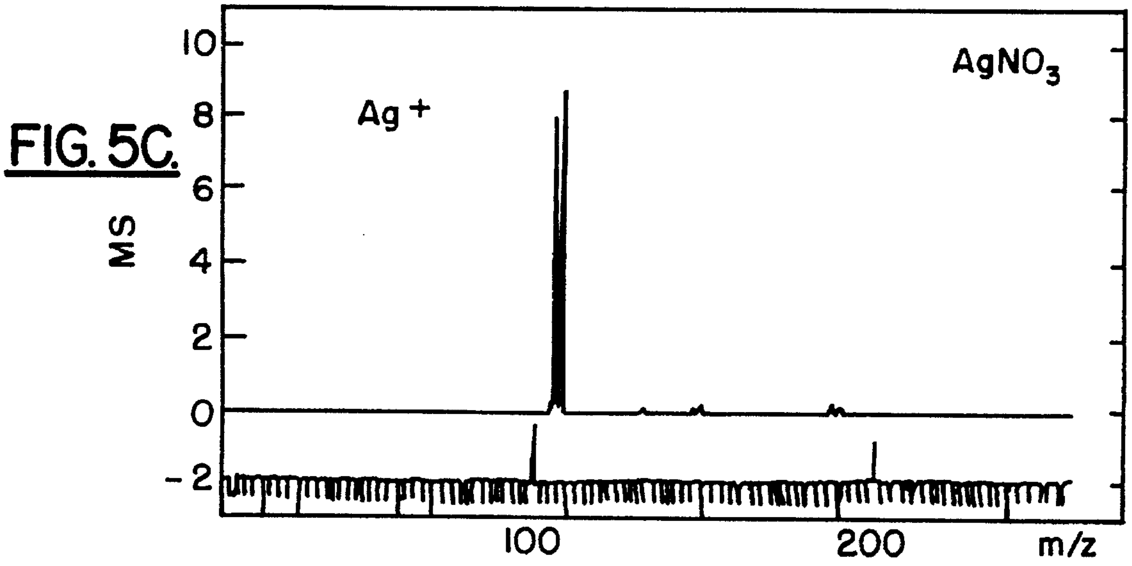

The spectra for the three salts (i.e., CsCl, CuSO4 and AgNO3) are shown in FIGS. 5A–5C and are startling. The selected ion currents are as about as high as are seen for any species. The background noise level is almost undetectable. There is no evidence of solvation except for the very tiny peaks corresponding to singly and doubly solvated Ag ions. This absence of apparent solvation does not mean that the ions were "nude" as they desorbed from the droplet. They probably were solvated then but subsequently were desolvated as they drifted through the drying gas toward the capillary entrance. Any remaining molecules of solvation were then removed by ion-molecule collisions in the free jet due to the field resulting from the 125 volt potential difference that was maintained between capillary exit 24 and skimmer 28.

Such a large voltage would have caused extensive fragmentation of the complex and fragile organic molecules that we had previously been working with. For the atomic ions of interest in these experiments, the voltage that produced the best signal could be used because fragmentation was not a concern.

Figure 6:
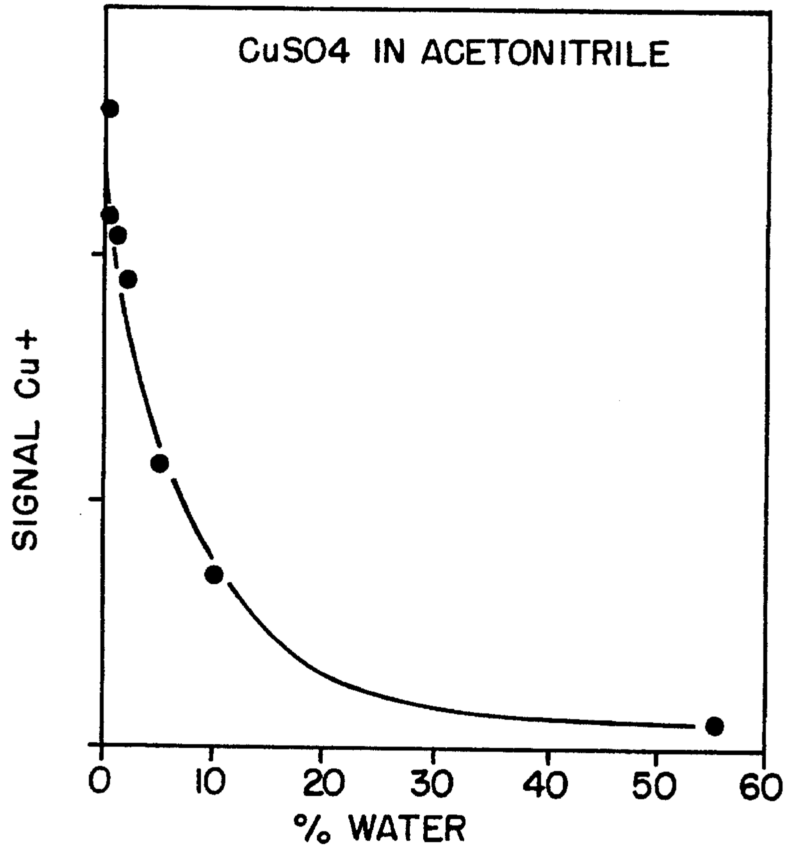
FIG. 6 is a plot of the dependence of ESMS signal for Cu+ on the water content of an acetonitrile solution of CuSO4.

The main difference between our experiments and those of the previous investigators is the almost complete absence of water in our analyte solutions. Accordingly, a study was carried out with $CuSO_4$ in which the amount of water was successively increased in the ACN sample solution. As shown in FIG. 6, with increasing water content the Cu+ signal rapidly decreased—to 25% of its initial value at 10% water and 4% at 50% water! Most of the decrease appearing in the Cu+ signal occurred between 0% water and approximately 20–25% water.

Having obtained such startling results with anhydrous ACN, experiments were tried with anhydrous methanol (MeOH) and found similar behavior. Table 1 below summarizes those results in terms of relative values of selected-ion currents(signal) for each of several metals in both MeOH and ACN.

TABLE 1

| Metal | Signal in MeOH | Signal in ACN | Ratio |
|---|---|---|---|
| Cs | 3000 | 1500 | 2.0 |
| Cu | 440 | 550 | 0.8 |
| Ag | 1450 | 450 | 3.2 |
| Cr | 175 | 0 | — |
| Pb | 700 | 85 | 8.2 |

Figure 7A:
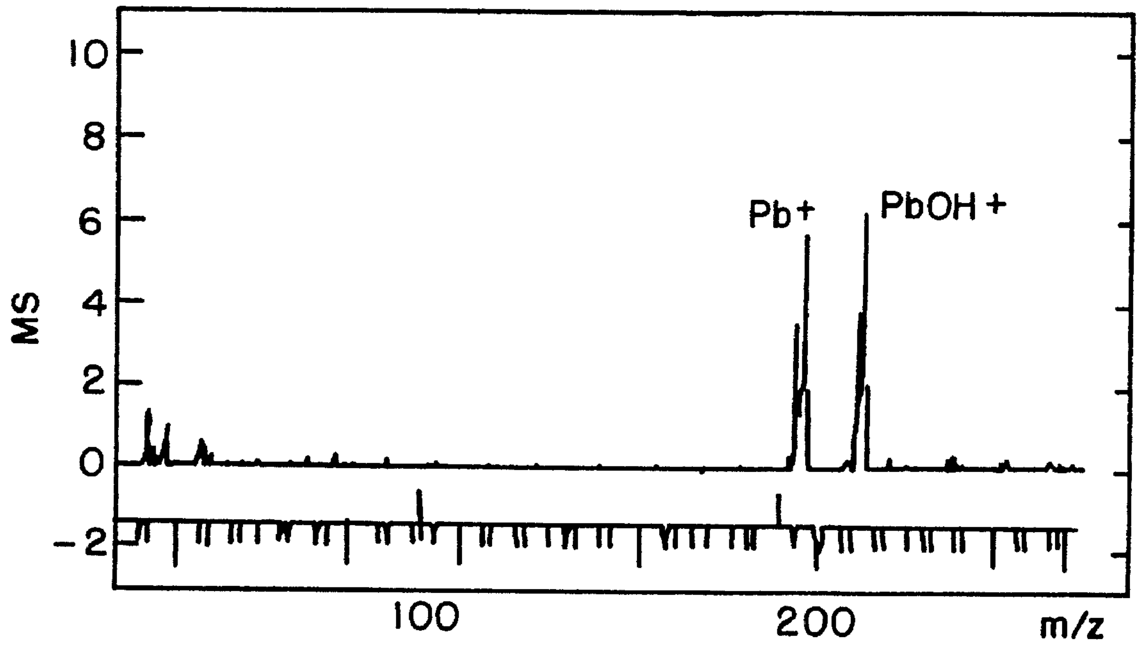
FIGS. 7A and 7B are ESMS spectra obtained with a solution of lead acetate at a concentration of 0.4 mM in methanol.
Figure 7B:
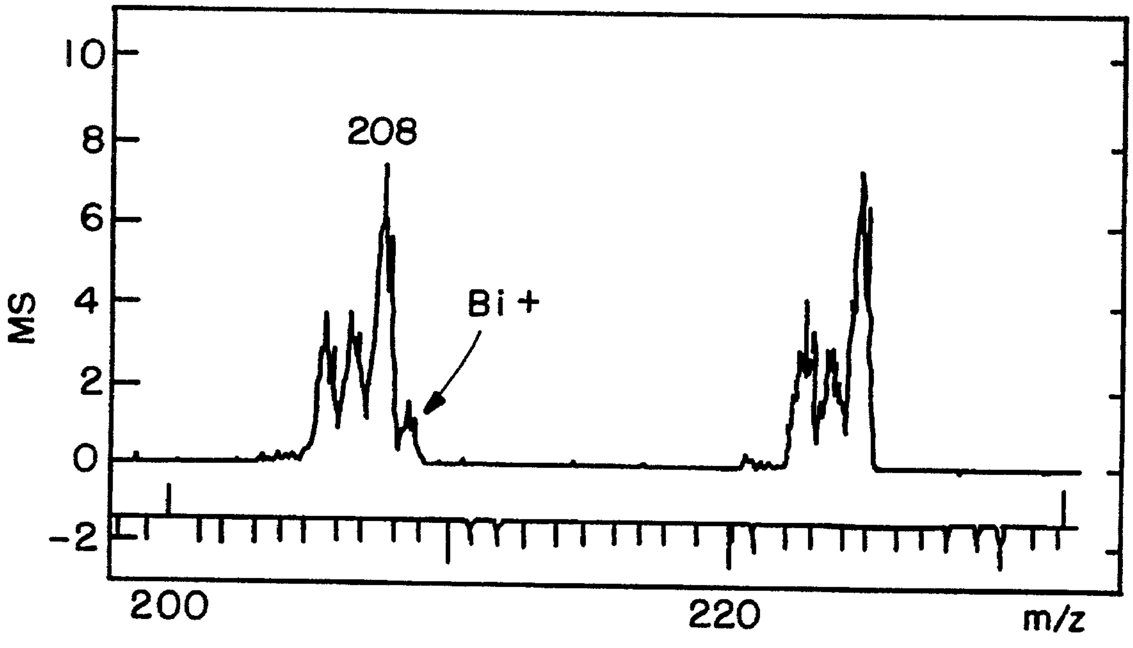

FIGS. 7A and 7B illustrate ESMS spectra obtained with a solution of lead acetate at a concentration of 0.4 mM in methanol. The peak at m/z=208 in FIG. 7A is for lead cations. The peak at m/z=225 is most likely due to a lead ion with an OH or $NH_3$ group attached. The peak height at 208 is 8 times higher than the same peak in an ESMS spectrum for lead acetate at the same concentration in acetonitrile. If the nozzle/skimmer voltage difference was increased above 220 volts, it is possible to double the Pb+ signal by stripping the OH or $HN_3$ from the PbOH ions. The higher resolution spectrum in FIG. 7B clearly shows that the peaks at 208 and 225 are actually triplets corresponding to the three most abundant isotopes of lead. The fourth peak at m/z of 209 is due to bismuth which is often found in lead ores and has only one stable isotope of appreciable abundance.

It is clear from the experiments that observed signals depend strongly on the analyte species (metal) as well as on the solvent used. There is much to be learned as to what will happen with other metal-solvent combinations. However, in light of this invention, a few judiciously chosen experiments regarding a best solvent for a particular ion species will enable one skilled in the art to identify a near optimal choice of solvent and operating conditions for the analysis of water for particular species.

In an experiment directly relevant to the objectives of the invention, ESMS mass spectra were obtained with a solution comprising one percent tap water (New Haven) and 99 percent ACN. The result is the mass spectrum in FIG. 8 which shows strong peaks for Ca, Na, K, Fe, and Cu. Table 2 below shows the assay for New Haven water carried out about the same time by the South Central Connecticut Regional Water Authority using a Perkin-Elmer instrument equipped with a graphite furnace source to perform Atomic Absorption Analysis.

TABLE 2

| Metal | Concentration (ppm) |
|---|---|
| Ca | 5.4 |
| Mg | 2.0 |
| Fe | 0.02 |
| K | 0.67 |
| Cu | 0.01 |
| Mn | 0.01 |
| Pb | 0.001 |
| Al | 0.04 |
| Na | 8.0 |
| Zn | 0.09 |

Figure 8:
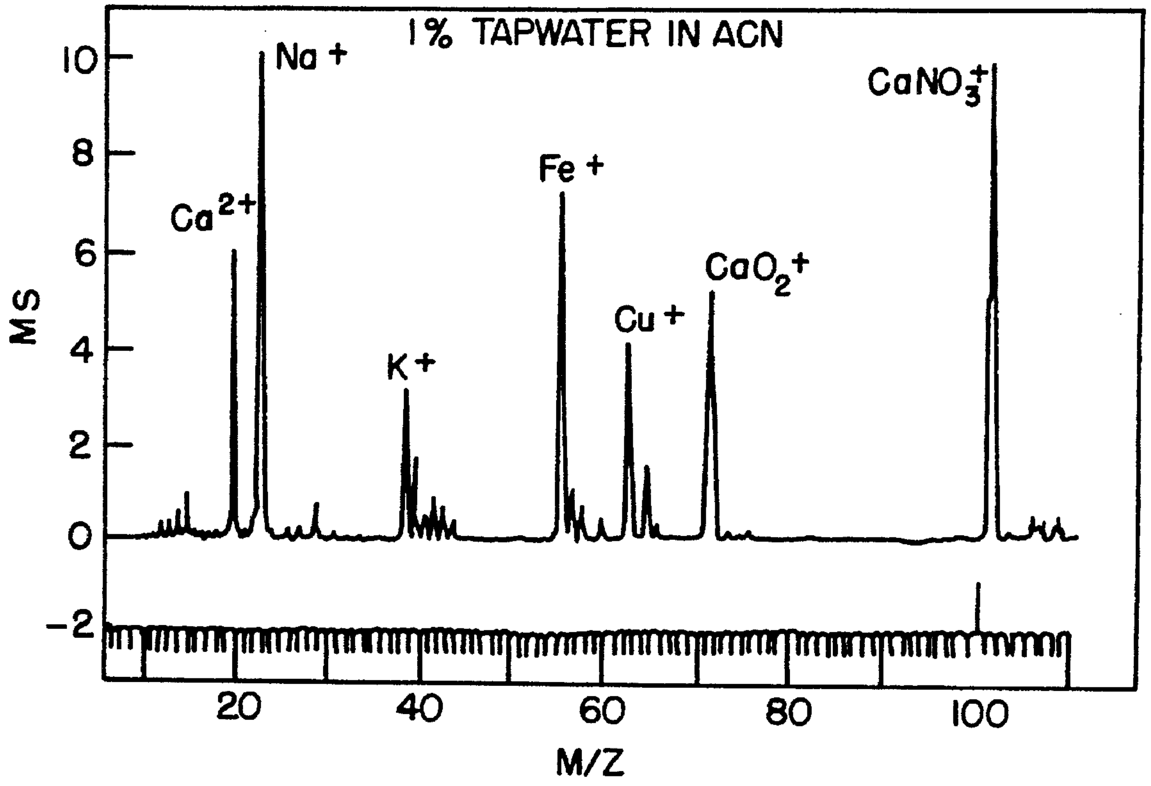
FIG. 8 is an electrospray mass spectrum obtained with a solution comprising one percent water from the laboratory tap and 99 percent acetonitrile.

Comparison of the results in Table 2 with those of the experiment shown in FIG. 8 indicates that there are several species shown in the Table 2 for which there are no peaks in the spectrum. However, their absence does not mean they cannot be detected by ESMS. For example, as Table 1 shows, Cr gave no signal in ACN but a very respectable one in MeOH. Also to be remembered is that much can happen to water between the time it leaves the pumping station and when it comes out of the tap in the laboratory. For example, peaks for Fe and Cu are much larger relative to K in the spectrum than they are in Table 2. It is likely that the amount of Fe and Cu in the sampled water could well have been augmented by passing through, and/or standing in, intervening pipes. Of the species shown in the spectrum it would seem that K was least likely to be gained or lost. The AAA assay at the pumping station showed 0.67 ppm. The K peak at 39 in the spectrum is one of a cluster of 6 peaks. Of these, it is believed that the peak at 41 stems from ions of the other reasonably abundant isotope of K. The other four are probably due to neat or nude, singly charged ions of the various Ca isotopes. From the apparent value of signal/noise it is estimated that the simple procedure leading to FIG. 8 could probably detect K at a few tens of ppb in its original matrix.

The most important finding from FIG. 8 is that a 100 fold dilution of an initially aqueous sample with anhydrous organic solvent led to much stronger ESMS signals for metal ions than could be obtained with the original, more concentrated, aqueous solution. It is unlikely that in this experiment, the best combination of amount and identity of diluting solvent was happened upon. Consequently, we believe that optimizing these factors may result in higher analytical sensitivities for metal species than already obtained. Such optimization can be readily achieved by one skilled in the art who is aware of what this invention teaches. Also to be noted is that all measurements were obtained with a multiplier detector in the analog mode. Ion-counting detection will probably increase signal/noise, and thus sensitivity, by factors of 10 to 100.

The discussion so far has related to measurements of positively charged species that are cationic in the sample solution. ESMS can also determine concentrations of anionic species. One simply changes the polarity of injection needle 10 relative to the surroundings so that the initial droplets are negatively charged. Then, evaporation of the droplets results in the desorption of negatively charged species comprising solute anions, alone or in aggregation with non-ionic solute species, just as in the case of positive ion formation.

There are several reasons for an emphasis on positive ions in past experiments. (1) A corona discharge will occur at a much lower field intensity (voltage) when injection needle 10 is negatively charged than when it is positively charged. Such a corona discharge essentially destroys the effectiveness of electrospray's ability to produce solute ions. One can "postpone" the onset of negative coronas to higher voltages by providing a small flow of gases like oxygen or sulfur hexafluoride around the needle tip but that expedient is a nuisance. (2) Detection of negative ions after mass analysis is less straightforward and more difficult than when the ions are positive. Both of these problems are readily overcome, but working with positive ions is generally more convenient. (3) Many complex organic species of great biochemical interest, whose mixtures are readily separated by liquid chromatography, especially peptides and proteins, provide much stronger signals in the positive ion mode. For these three reasons, most ESI studies have been with positive ions. However, negative ions such as halides, phosphates and nitrates, along with many other small inorganic ions have been readily detected. An extension of the practice of this invention to those species will be obvious to anyone reasonably skilled in the art of electrospray mass spectrometry.

An ability to detect and measure free metal ions is, of course, only one facet of the general problem of analyzing for metals in environmental waters. More often than not, much of the metal content of such waters is not in the form of ions but in complexes with organic materials such as humic acids, fulvic acids, humin, carbohydrates, peptides, porphyrins and a variety of other ligands. To understand the chemical processes of metals in environmental waters and their role in the food chain of aquatic life, one needs to know the nature and identities of the solute entities that actually contain the metal atoms or ions. The process and the result of determining those identities is frequently referred to as "speciation".

Investigators have increasingly recognized that ESMS is a powerful tool for detecting, identifying, examining and characterizing metallo-organic complexes important in biochemical systems. More recently, it has been discovered that ESMS are a powerful supplement to NMR in the study of metal-ligand complexes (R. Colton et al, Inorganic Chemistry 32,2626(1993)). Thus the invention allows investigators to combine two attractive features in a single instrument (an Electrospray Mass Spectrometer): (1) the ability to detect and analyze small inorganic ionic species in water with a sensitivity and universality that equals or exceeds the abilities of Atomic Absorption Analysis and Inductively Coupled Plasma Mass Spectrometry, and (2) the ability to detect and analyze the much more fragile complexes with organic substances in which these inorganic ions are often found in environmental waters. Indeed, because of its "softness" and consequent lack of fragmentation, ESMS is unique in its ability to analyze such complexes.

In the specific examples so far discussed, the solvents used were methanol and acetonitrile, but the practice of the invention is not limited to those solvents. As has been pointed out, the invention contemplates a substantial dilution of the initial sample solution by any solvent for which the small inorganic ions of interest have appreciably less affinity than for water. As the examples have shown, different ions behave differently with different diluting solvents. There is a great variety of solvents available and a great number of inorganic ions that might be subjects for analysis. The number of possible permutations and combinations is large and there is no one recipe that will give optimum results in every conceivable situation. However, there are some general rules that can be set forth.

Clearly the solvent must be miscible with the sample solution, otherwise the required dilution would not be possible. Moreover, the solvent must be reasonably volatile so that the tiny electrospray droplets of the diluted sample solution can evaporate almost completely in the relatively short time available between their formation and their arrival at the aperture leading to the vacuum system. In addition, solvents should be used that have lower values than water for properties that are believed to be important in determining the work that must be done in removing an ion from the droplet solution. Those properties include viscosity, dielectric constant, and surface tension. Of course, the invention also contemplates the use of mixtures of solvents that may work better than any single solvent as a diluent for the initial sample solution.

With a few experiments, a skilled investigator will be able to screen a range of candidate solvents and select one or more that alone or in combination is effective for the particular analyte species of interest. Experience suggests that appropriate initial candidates to be used alone or in combination as diluents could be chosen from a group that includes alcohols, ethers, aldehydes, ketones, esters, nitriles, hydrocarbons, halogenated hydrocarbons, dimethyl sulfoxide,and dioxane. Other possibilities will occur to an investigator as his or her experience accumulates.

The essential feature of this invention is the discovery that substantial dilution of an initial aqueous sample with an appropriate solvent can greatly increase the mass spectrometer signal for inorganic ions that the sample may contain. This finding is counter-intuitive, extremely useful, and surprising.

Another point concerns the problem of obtaining results that will allow an investigator to determine, quantitatively, relative concentrations of different ion species that might be found in a solution, especially when the original solution must be diluted by a substantial amount. A possible approach is to make use of an internal reference standard. Thus, one would add to the original sample, before dilution, a known amount of a species that preliminary experiments show is absent in the original solute, for example, a cesium salt. Then, in the final mass spectrum obtained with the diluted sample, in a ratio of peak height of any species to the peak height for the reference species would give the concentration of that species relative to concentration of the standard species in the original sample (which is known). Of course, calibration experiments are needed to allow for differences in desorption, transmission and detection efficiencies for the different species. Such calibration procedures in conjunction with internal reference standards are well known to those skilled in the art of mass spectrometry.

In the experiments that have been described, the metal ions were stripped of solvent molecules or other ligands by collision with neutral molecules in the free jet before they entered the analyzer which, in our case, was a single quadrupole mass filter. It is possible to practice the invention and achieve the same results in much the same way with other kinds of analyzers. In systems capable of performing so-called tandem mass spectrometry or MS-MS, one can practice the invention in a somewhat different procedure that would arrive at the same result. In a tandem mass spectrometer, one uses a first mass analyzer or analysis step to pass or select ions of a particular mass/charge ratio. Those selected ions are then subjected to collisional dissociation, after which the resulting ion fragment ions are mass analyzed in a second mass analyzer or analysis step. Thus, in the practice of the invention with such a system, the first analysis could select metal cations with, say, one solvent molecule attached. In the collision step those selected ions would lose that solvent molecule and then be analyzed in the second analysis step. The same procedure could be repeated except that the first analysis step would select metal cations with say two solvent molecules attached which would then be removed in the collision step. The second analysis step would then determine the number of bare cations that had entered the first analysis step with two molecules of solvation. This procedure could be repeated until analogous measurements had been made of all the species of initial ions that comprised a particular metal cation with n molecules of solvation. The results of each measurement could then be added to give the total number of initial ions of all masses that comprised the particular metal cation, thereby determining the total number of such ions in the original sample of aqueous solution that had been diluted with organic solvent.

Such tandem mass spectrometry can be carried out by passing the initial stream of ions from the electrospray source through a succession of analyzers. The most common of such "successions" is the so called triple quadrupole in which a first quadrupole selects ions of a particular mass from the source. A second quadrupole receives the ions selected by the first quadrupole. It is powered with rf energy, but with no dc bias applied so that it passes ions of all mass/charge ratios. A small pressure of a collision gas, such as argon, is maintained in the second quadrupole so that ions leaving the first quadrupole will be subjected to collisional dissociation in the second quadrupole. The fragment ions resulting from the collisions then pass into a third quadrupole that analyzes the masses of those fragment ions.

In principle, in the absence of any intermediate ion losses, it is possible to put any number of such quadrupoles in succession to achieve any desired number of stages of dissociation and analysis. In practice, both leakage losses and apparatus costs rise rapidly so that except for a few experimental five stage systems, most such tandem mass spectrometry is done with "triple quads" that provide two stages of mass analysis and one dissociation step between them.

Multistage tandem mass spectrometry is perhaps best carried out in ion trap instruments which include the quadrupole ion trap and the Ion Cyclotron Resonance or ICR machines. In these machines the first and succeeding mass analyses are carried out in the same trap or cell, with a collision gas being introduced into the cell between each stage of mass analysis. Such systems can provide many stages of dissociation and analysis without appreciable increase in cost. In any of its variations, tandem mass spectrometry in the practice of this invention can provide a great deal of detailed information on the identity and structure of any large and complex solute ion species that might be present in any solution samples to be analyzed. Even so, the advantage of substantially diluting the initial solution sample with organic solvent, as taught by the invention, still applies.

Only a few of the many possible procedural variations for practicing the invention have been described. Others will become apparent to those skilled in the pertinent arts. The scope of the invention is such that it contemplates all of these variations that make use of its two essential features: (1) Enhancing the signal for small inorganic ions in electrospray mass spectrometric analysis of aqueous solutions by substantially diluting a sample of the aqueous solution with an organic solvent, and (2) Removal of solvent molecules and other ligands from the small inorganic ions formed in electrospray ionization before mass analysis is complete, by appropriate application of electric fields to accelerate the ions so they will have energetic collisions with neutral gas molecules.

What is claimed is:

1. A method for analyzing an aqueous solution for the presence of ionic species, the method comprising the steps of:

(a) diluting said aqueous solution by creating a mixture therewith of a substantial volume of a volatile organic solvent, so that said aqueous solution thereafter comprises a small percentage of the solvent and aqueous solution mixture, said diluting resulting in at least a 5 to 1 dilution of said aqueous solution by said solvent; and (b) subjecting the mixture to an electrospray mass spectrometric analysis.

2. The method as recited in claim 1 wherein said ionic species is inorganic.

3. The method as recited in claim 1 wherein said volatile organic solvent is water soluble and includes at least one component taken from the group comprising alcohols, glycols, aldehydes, ethers, ketones, nitriles, esters, halogenated hydrocarbons, dimethyl sulfoxide and dioxane.

4. The method as recited in claim 1 wherein an electrospray mass spectrometer performs said analysis and includes a dielectric capillary with a conductive collar outlet juxtaposed to a skimming opening into a multipole analyzer, said subjecting step b including the further step of:

applying a potential between said conductive collar and said skimming opening that acts to accelerate said ionic species towards said skimming opening and enhances desolvation of said ionic species.

5. The method as recited in claim 4, wherein voltage polarities in said electrospray mass spectrometer are set so as to produce and analyze positive ions.

6. The method as recited in claim 4, wherein voltage polarities of said electrospray mass spectrometer are set so as to produce and analyze negative ions.

7. The method as recited in claim 1 wherein ions formed from said mixture in said electrospray mass spectrometric analysis are subjected to energetic collisions with neutral gas molecules after said ions leave a region of their formation and before mass analysis.

8. The method as recited in claim 7, wherein said energetic collisions of said ions with neutral gas molecules are brought about by an electric field that accelerates the ions relative to the neutral molecules.

9. The method as recited in claim 7, wherein the collisions between ions and neutral gas molecules are sufficiently energetic that essentially all ligands are removed from core ions before mass analysis.

10. A method for analyzing an aqueous solution for the presence of ionic species, the method comprising the steps of:

(a) diluting said aqueous solution by creating a mixture therewith of a substantial volume of a volatile organic solvent, so that said aqueous solution thereafter comprises a small percentage of the solvent and aqueous solution mixture; and (b) subjecting the mixture to an electrospray mass spectrometric analysis, said diluting of step (a) of said aqueous solution being such that the diluted solution entering said electrospray mass spectrometric analysis contains less than ten percent water.

11. The method as recited in claim 10 wherein said ionic species is inorganic.

12. The method as recited in claim 10 wherein said volatile organic solvent is water soluble and includes at least one component taken from the group comprising alcohols, glycols, aldehydes, ethers, ketones, nitriles, esters, halogenated hydrocarbons, dimethyl sulfoxide and dioxane.

13. The method as recited in claim 10 wherein an electrospray mass spectrometer performs said analysis and includes a dielectric capillary with a conductive collar outlet juxtaposed to a skimming opening into a multipole analyzer, said subjecting step b including the further step of:

applying a potential between said conductive collar and said skimming opening that acts to accelerate said ionic species towards said skimming opening and enhances desolvation of said ionic species.

14. The method as recited in claim 13, wherein voltage polarities in said electrospray mass spectrometer are set so as to produce and analyze positive ions.

15. The method as recited in claim 13, wherein voltage polarities of said electrospray mass spectrometer are set so as to produce and analyze negative ions.

16. The method as recited in claim 10, wherein ions formed from said mixture in said electrospray mass spectrometric analysis are subjected to energetic collisions with neutral gas molecules after said ions leave a region of their formation and before mass analysis.

17. The method as recited in claim 16, wherein said energetic collisions of said ions with neutral gas molecules are brought about by an electric field that accelerates the ions relative to the neutral molecules.

18. The method as recited in claim 16, wherein the collisions between ions and neutral gas molecules are sufficiently energetic that essentially all ligands are removed from core ions before mass analysis.

* * * * *